United States Patent
Onda

(10) Patent No.: US 8,807,391 B2
(45) Date of Patent: Aug. 19, 2014

(54) PAINT CARTRIDGE

(75) Inventor: Toshio Onda, Tokyo (JP)

(73) Assignee: ABB K.K., Tokyo (JP)

( * ) Notice: Subject to any disclaimer, the term of this patent is extended or adjusted under 35 U.S.C. 154(b) by 207 days.

(21) Appl. No.: 13/381,268

(22) PCT Filed: Nov. 1, 2010

(86) PCT No.: PCT/JP2010/069424
§ 371 (c)(1),
(2), (4) Date: Dec. 28, 2011

(87) PCT Pub. No.: WO2011/070874
PCT Pub. Date: Jun. 16, 2011

(65) Prior Publication Data
US 2012/0103850 A1    May 3, 2012

(30) Foreign Application Priority Data
Dec. 8, 2009 (JP) .................. 2009-278598

(51) Int. Cl.
B65D 35/56 (2006.01)
B67D 7/06 (2010.01)
B67D 7/56 (2010.01)
B65D 35/28 (2006.01)
G01M 3/04 (2006.01)

(52) U.S. Cl.
USPC ................ 222/105; 222/23; 222/95; 73/40.7

(58) Field of Classification Search
CPC .......... G01M 3/20; G01M 3/042; B05B 5/16; B05C 11/10
USPC .......... 222/95, 105, 323, 386.5, 389, 23, 322; 73/40.7, 762; 206/459.1
See application file for complete search history.

(56) References Cited

U.S. PATENT DOCUMENTS

2007/0068224 A1   3/2007  Watanabe et al.
2009/0206177 A1   8/2009  Hamamura et al.

FOREIGN PATENT DOCUMENTS

| EP | 1 602 909 | 12/2005 |
|---|---|---|
| JP | 2005 230718 | 9/2005 |
| JP | 2006 187732 | 7/2006 |
| JP | 2007 78591 | 3/2007 |
| JP | 2009 248052 | 10/2009 |
| WO | 2008 068957 | 6/2008 |

OTHER PUBLICATIONS

International Search Report issued on Dec. 14, 2010 in PCT/JP10/069424 filed on Nov. 1, 2010.

*Primary Examiner* — Paul R Durand
*Assistant Examiner* — Vishal Pancholi
(74) *Attorney, Agent, or Firm* — Oblon, Spivak, McClelland, Maier & Neustadt, L.L.P.

(57) ABSTRACT

A paint cartridge includes a baggy tank having a dual structure formed by an inner bag and an outer bag in a cylindrical body. Inside the inner bag is a paint chamber. Between the outer bag and the cylindrical body, an extruding liquid flows. A detector provided in the space between the inner bag and the outer bag is visually observable from outside the cylindrical body. In the detector, a pattern formed by using one or more materials changes due to contact with paint which leaks when the inner bag has broken or with extruding liquid which leaks when the outer bag has broken. In consequence, it is possible to detect the breakage of the inner bag and the outer bag by visually observing a change in the detector's pattern from the outside.

8 Claims, 13 Drawing Sheets

US 8,807,391 B2

PAINT CARTRIDGE

TECHNICAL FIELD

The present invention relates to a paint cartridge which is interchangeably mounted on, for example, a paint spraying means and supplies a paint filled in its interior toward the paint spraying means.

BACKGROUND ART

Generally, it is desired that a coating system for coating a work piece such as the body of an automobile should be able to reduce the amount of paint discarded at the time of color change and should be able to cope with numerous coating colors. As a coating system for coping with this, a cartridge type coating system is known which is arranged such that a paint cartridge with a paint of each color filled therein is interchangeably mounted on a coating apparatus which is a paint spraying means.

The paint cartridge used in this cartridge type coating system is largely constituted by a tank accommodating cylindrical body formed of a transparent or translucent hollow tubular body whose front side in the front and rear directions is mounted to the coating apparatus and by a baggy tank which is provided in that tank accommodating cylindrical body, has its interior formed as a paint chamber for the efflux and influx of a paint to supply the paint to the coating apparatus, and has its exterior between the same and the tank accommodating cylindrical body formed as an extruding liquid chamber for the efflux and influx of an extruding liquid for extruding the paint in the paint chamber.

Here, since the baggy tank is formed by a bag constituted of a flexible resin material, the baggy tank has a possibility of breaking and forming a hole due to aged deterioration and the like. If coating is continued with the hole formed in the baggy tank, the paint and the extruding liquid become mixed and disadvantageously cause a deterioration in the coating quality.

Accordingly, the paint cartridge is arranged such that the baggy tank is formed in a dual structure constituted by an inner bag and an outer bag, and an atmosphere passage for making the space between the inner bag and the outer bag open to the atmosphere is provided in the tank accommodating cylindrical body. Consequently, in the event that the inner bag or the outer bag of the baggy tank has broken and a hole has been formed, the paint or the extruding liquid is discharged through the space between the inner bag and the outer bag to the outside via the atmosphere passage, thereby making it possible to notify the breakage of the inner bag or the outer bag (for example, Patent Documents 1, 2, 3, and 4).

PRIOR ART DOCUMENTS

Patent Documents

Patent Document 1: International Publication Pamphlet No. 2008/068957
Patent Document 2: Japanese Patent Laid-Open No. 2006-187732 A
Patent Document 3: Japanese Patent Laid-Open No. 2009-248052 A
Patent Document 4: Japanese Patent Laid-Open No. 2005-230718 A

SUMMARY OF THE INVENTION

Incidentally, in the above-described patent documents, the breakage of the inner bag or the outer bag of the baggy tank is inspected by visually confirming whether or not the paint or the extruding liquid is being discharged from the atmosphere passage of the tank accommodating cylindrical body. In this instance, however, there are cases where it takes time until the paint or the extruding liquid which flowed into the space of each bag from the broken portion of the baggy tank reaches the atmosphere passage of the tank accommodating cylindrical body. For this reason, there is a drawback that it takes time until the breakage of the baggy tank is recognized.

Further, there are cases where a transparent clear paint which does not contain a coloring pigment is accommodated in the paint chamber. In addition, a transparent liquid exhibiting a high electrical resistance value, such as pure water, an organic solvent, or the like, is normally used as the extruding liquid accommodated in the extruding liquid chamber in order to prevent a high voltage applied to the paint from leaking to the ground and to prevent the change in quality of the paint when mixed with the paint. In consequence, it is difficult to visually confirm the transparent clear paint or solvent even if it is discharged from the atmosphere passage. For this reason, there is a drawback that it is impossible to recognize the breakage of the baggy tank at an early stage.

Moreover, since the tank accommodating cylindrical body which covers the baggy tank is formed to be transparent or translucent, the baggy tank can be visually inspected through the tank accommodating cylindrical body. However, even if the inner bag breaks and the paint flows into the space, or the outer bag breaks and the extruding liquid flows into the space, the inner paint is only seen through the tank accommodating cylindrical body, the extruding liquid, and the baggy tank. For this reason, the baggy tank, when viewed from the outside, appears to have undergone no change, so that there is a problem in that the breakage of the baggy tank cannot be easily confirmed.

In view of the above-discussed problems with the conventional art, it is an object of the present invention to provide a paint cartridge which makes it possible to confirm the breakage of the inner bag and the outer bag of the baggy tank at an early stage by merely visually observing it from the outside.

(1) A paint cartridge in accordance with the present invention includes: a tank accommodating cylindrical body formed of a transparent or translucent hollow tubular body; a baggy tank which is provided in the tank accommodating cylindrical body as a dual structure formed by an inner bag and an outer bag, in which an interior of the inner bag serves as a paint chamber allowing the efflux and influx of a paint with respect to an outside of the tank accommodating cylindrical body, and in which a space between the outer bag and the tank accommodating cylindrical body serves as an extruding liquid chamber allowing the efflux and influx of an extruding liquid with respect to the outside of the tank accommodating cylindrical body; and an atmosphere passage provided in the tank accommodating cylindrical body to open a space between the inner bag and the outer bag of the baggy tank to an atmosphere.

To solve the above-described problems, a characteristic feature of the construction adopted in the present invention lies in that a detector which is visually recognizable from the outside through the tank accommodating cylindrical body is provided on the baggy tank, and the detector is formed by using a material whose shape, pattern, or hue changes due to contact with the paint or the extruding liquid when the inner bag or the outer bag has broken.

With this arrangement, when the inner bag breaks and a hole is formed, the paint in the paint chamber leaks to the space between the inner bag and the outer bag. In addition, when the outer bag breaks and a hole is formed, the extruding liquid in the extruding liquid chamber leaks to the space between the inner bag and the outer bag. At this time, since the detector undergoes a change in its shape, pattern, or hue due to contact with the paint or the extruding liquid which leaked to the space between the bags, it is possible to recognize the breakage of the inner bag or the outer bag by visually observing the change in the detector through the tank accommodating cylindrical body.

As a result, even in a case where the paint is a transparent clear paint, or the extruding liquid is transparent pure water or solvent, the breakage of the inner bag or the outer bag can be reliably recognized at an early stage by merely visually observing the detector of the baggy tank through the tank accommodating cylindrical body. It is thereby possible to suppress a deterioration in the coating quality and improve reliability.

(2) In this case, according to the present invention, the detector is arranged to be provided by making use of an outer surface of the inner bag and/or an inner surface of the outer bag of the baggy tank or in the space between the inner bag and the outer bag.

(3) According to the present invention, the detector is arranged to be provided on the baggy tank by using a material of a hue different from a coating color of the paint. By virtue of this arrangement, it is possible to clearly show the change in the shape, pattern, or hue due to contact with the paint or the extruding liquid.

(4) According to the present invention, the detector is arranged to be provided on the baggy tank by using materials of a plurality of kinds whose hues are different. Consequently, even in a case where the coating color of the paint accommodated in the paint chamber is not fixed, one kind of the detectors of a plurality of colors can be made noticeable with respect to the paint. As a result, the baggy tank can be formed as a general-purpose product capable of coping with paints of various colors.

(5) According to the present invention, the detector can be provided on the baggy tank by using at least one means among application, pasting, adhesion, printing, and transfer.

(6) According to the present invention, the material for forming the detector is at least one of an ink, a tape, a film, and a powder attached to the baggy tank. Consequently, the detector can be easily provided by attaching a material such as an ink, a tape, a film, a powder, or the like to the baggy tank.

(7) According to the present invention, the material of the detector is a plurality of capsules provided in the space between the inner bag and the outer bag, and each of the capsules can be constituted by an outer shell which is dissolvable by the paint and the extruding liquid and a detecting powder accommodated in the outer shell.

In consequence, when the inner bag or the outer bag breaks and a hole is formed, the paint or the extruding liquid leaks to the space between the bags. At this time, as the paint or the extruding liquid dissolves the outer shells of the detectors by coming into contact therewith to thereby release the inner detecting powders, so that the detectors under a change in shape by releasing the detecting powders. As a result, it is possible to recognize the breakage of the inner bag or the outer bag by mere visual observation through the tank accommodating cylindrical body.

MODE FOR CARRYING OUT THE INVENTION

Hereinafter, a paint cartridge according to an embodiment of the present invention is described more particularly with reference to the accompanying drawings, by citing as an example a case where the paint cartridge is installed in a rotary atomizing head type coating apparatus.

FIGS. 1 to 8 show a first embodiment in accordance with the present invention. In this first embodiment, a case is illustrated in which the paint cartridge is applied to a coating line in which only a specific paint is applied, e.g., a coating line in which a paint of the same coating color is sprayed as in coating of an exclusive color, undercoating, anticorrosive coating, and the like. In this case, the hue of color of the detector provided in the paint cartridge is set to an opposite color to the paint used or a hue close to the opposite color so that a change in the pattern of the detector can be clearly observed visually.

In the first embodiment, a case is illustrated in which one cartridge assembly is formed by mounting a paint cartridge on a cartridge mounting portion having a feed tube, and this cartridge mounting portion is secured and fitted to a coating apparatus to perform a coating operation.

Figure 1:
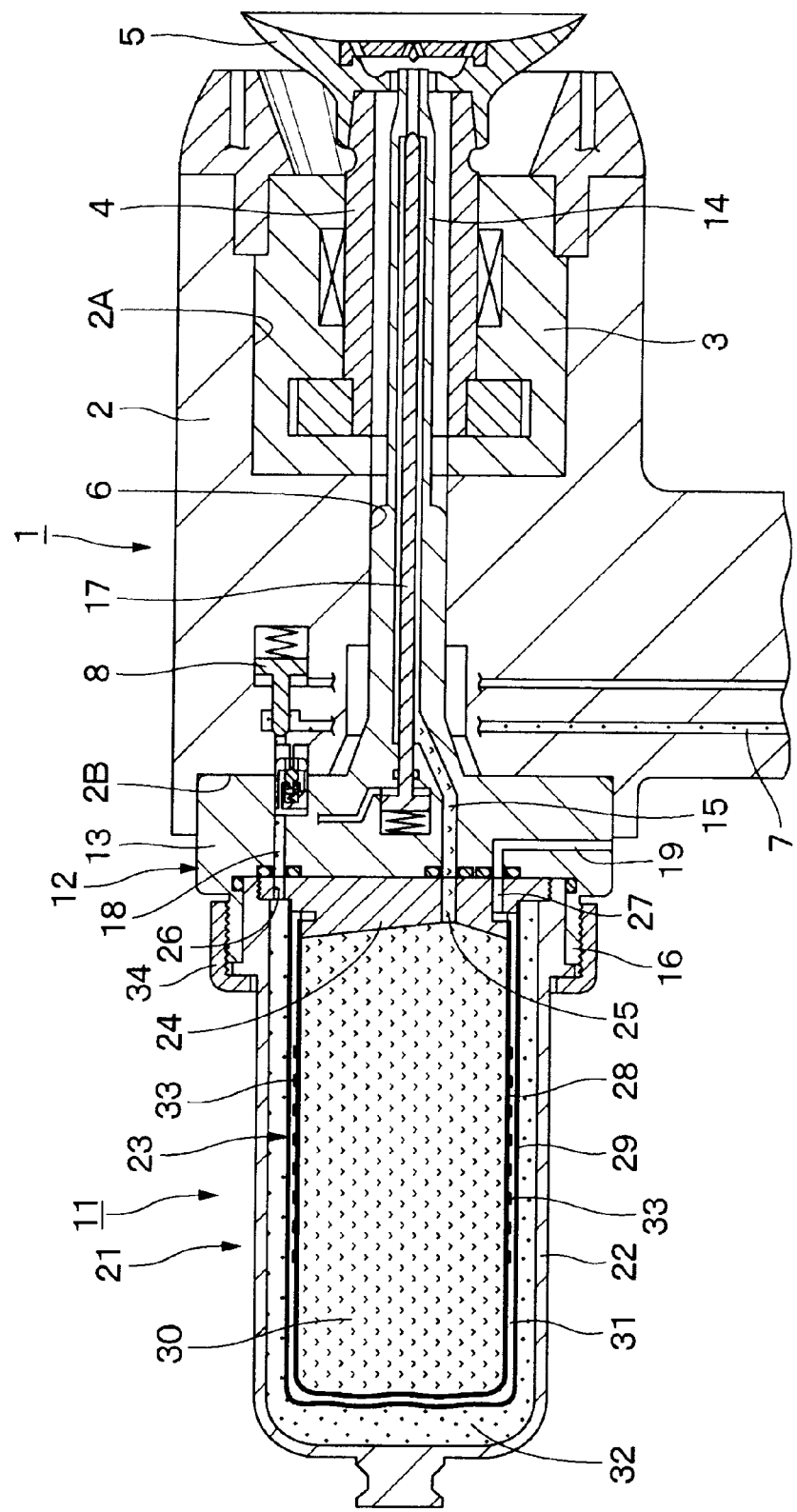
FIG. 1 is a longitudinal sectional view illustrating a state in which a paint cartridge in accordance with a first embodiment is mounted on a coating apparatus as a cartridge assembly.

In FIG. 1, designated at 1 is a rotary atomizing head type coating apparatus (hereinafter referred to as the coating apparatus 1) serving as a paint spraying means provided on a working machine (not shown) such as a coating robot, a reciprocator, or the like. This coating apparatus 1 is largely constituted by a housing 2 whose front side is formed as a motor mounting recess 2A and whose rear side is formed as a cartridge mounting recess 2B; an air motor 3 mounted in the motor mounting recess 2A of the housing 2; a rotational shaft 4 which is rotatively driven by the air motor 3; a rotary atomizing head 5 which is mounted on the fore end side of the rotational shaft 4 and is adapted to centrifugally atomize a paint by rotating so as to spray the paint toward a work piece; and a feed tube insertion hole 6 which is provided penetratingly from the center of the cartridge mounting recess 2B of the housing 2 to a distal end of the rotational shaft 4.

A high voltage generator (not shown) for boosting the voltage supplied from a power supply unit to −60 to −120 kV is provided in the housing 2. This high voltage generator applies a high voltage to the rotary atomizing head 5 through, for example the air motor 3 and the rotational shaft 4 to directly charge the paint.

Further, a housing side extruding liquid passage 7, through which an extruding liquid circulates, is provided in the housing 2, and an extruding liquid valve 8 is provided midway in the extruding liquid passage 7 so as to effect the supply and stoppage of an extruding liquid with respect to the below-described cartridge assembly 11.

Next, a description will be given of the cartridge assembly 11 in accordance with the first embodiment which is interchangeably mounted on the coating apparatus 1.

Figure 2:
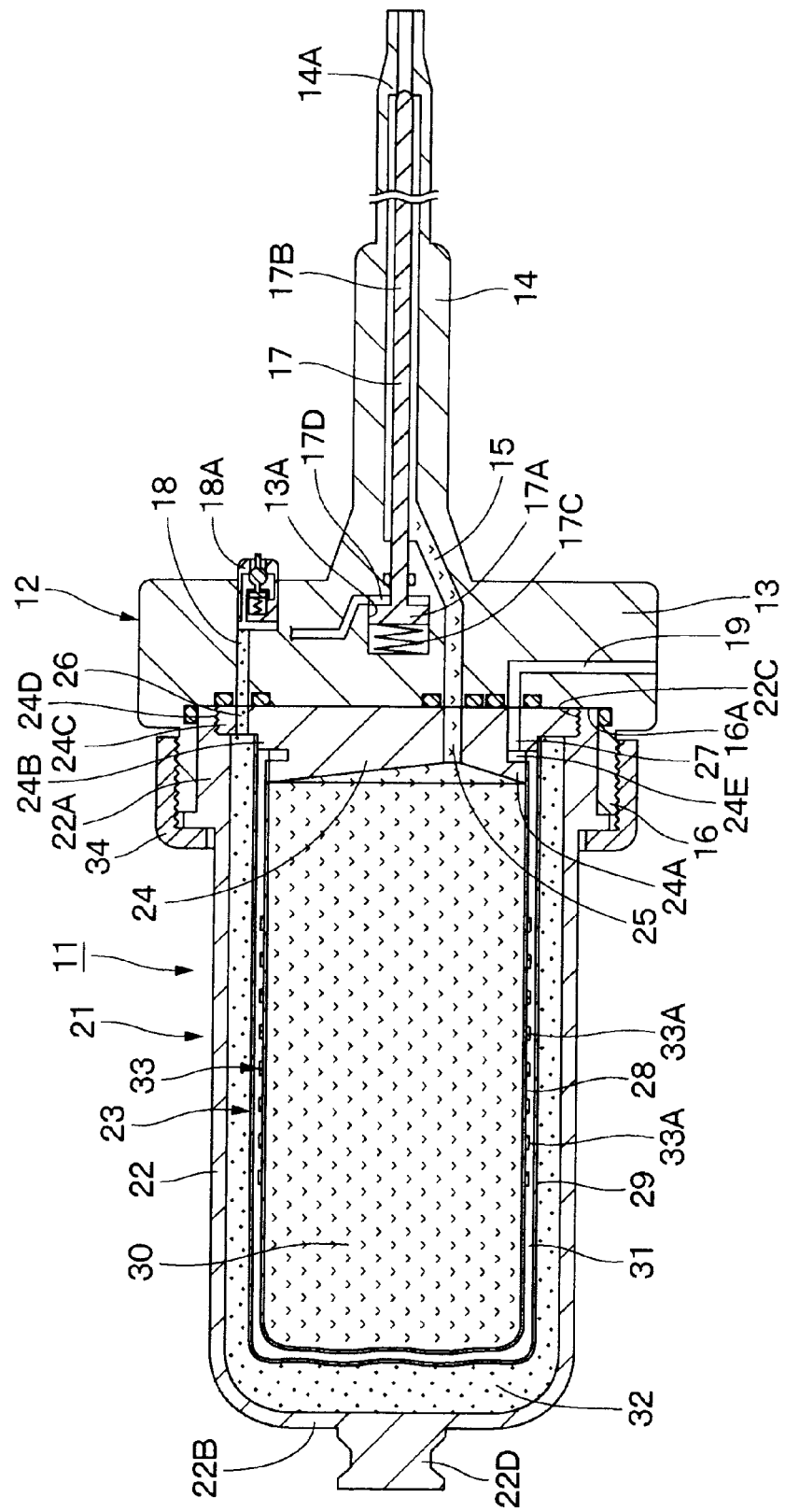
FIG. 2 is a longitudinal sectional view illustrating in enlarged form the cartridge assembly in FIG. 1 as a single unit.
Figure 3:
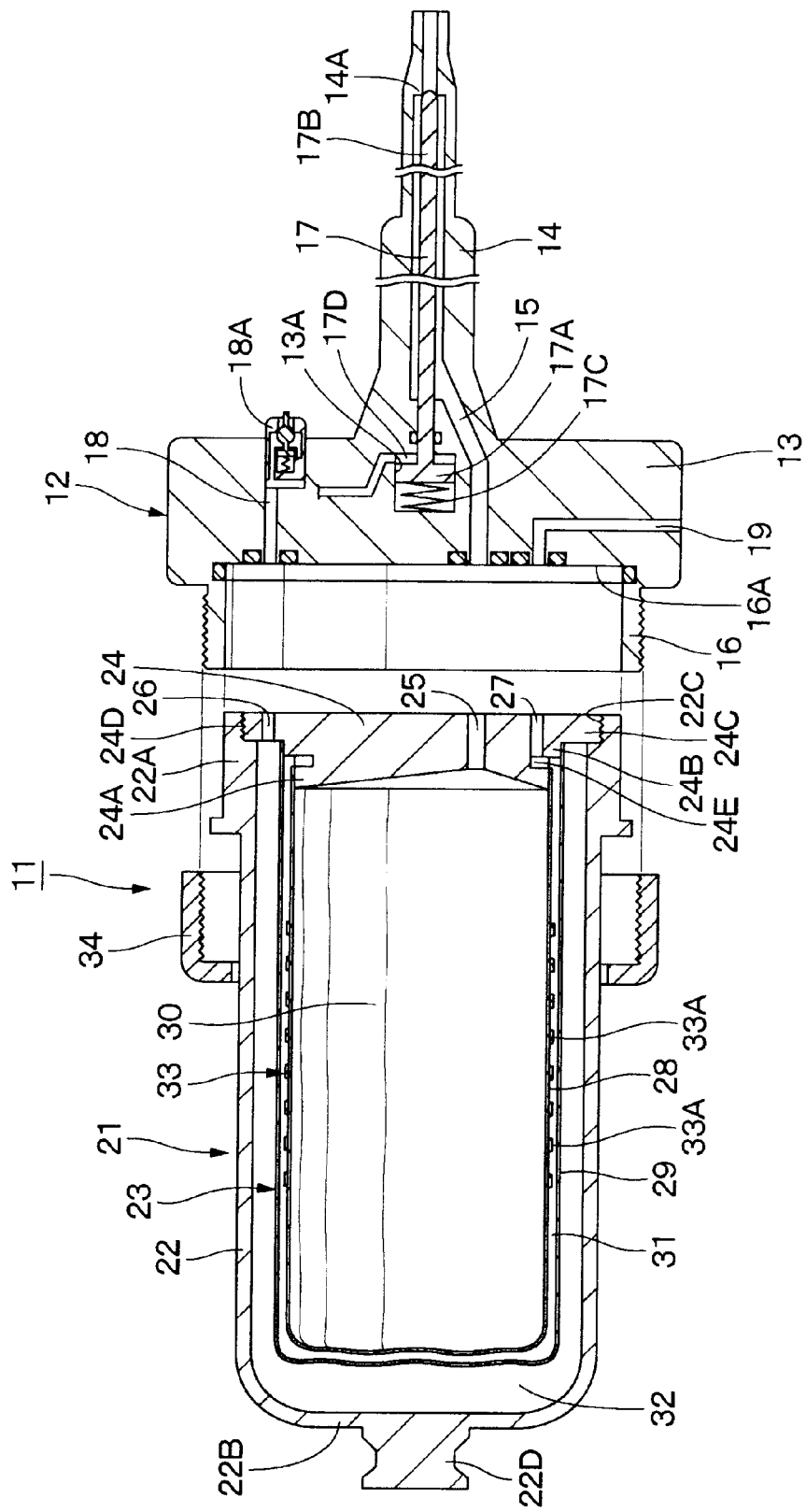
FIG. 3 is an exploded sectional view in which the cartridge assembly is disassembled into a cartridge mounting member, a paint cartridge, and a retainer ring.
Figure 4:
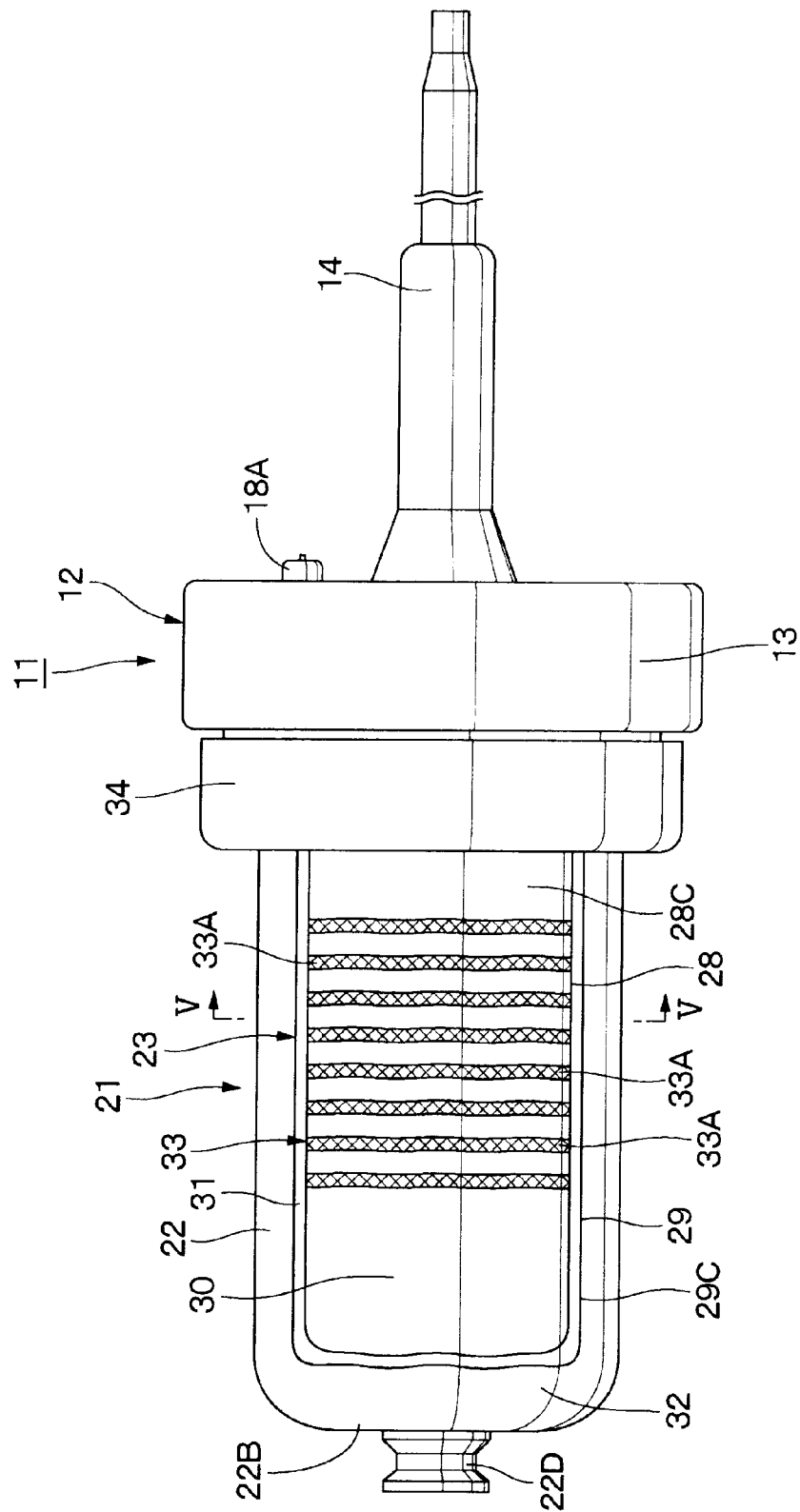
FIG. 4 is an external view of the cartridge assembly as a single unit taken from the outer side.
Figure 5:
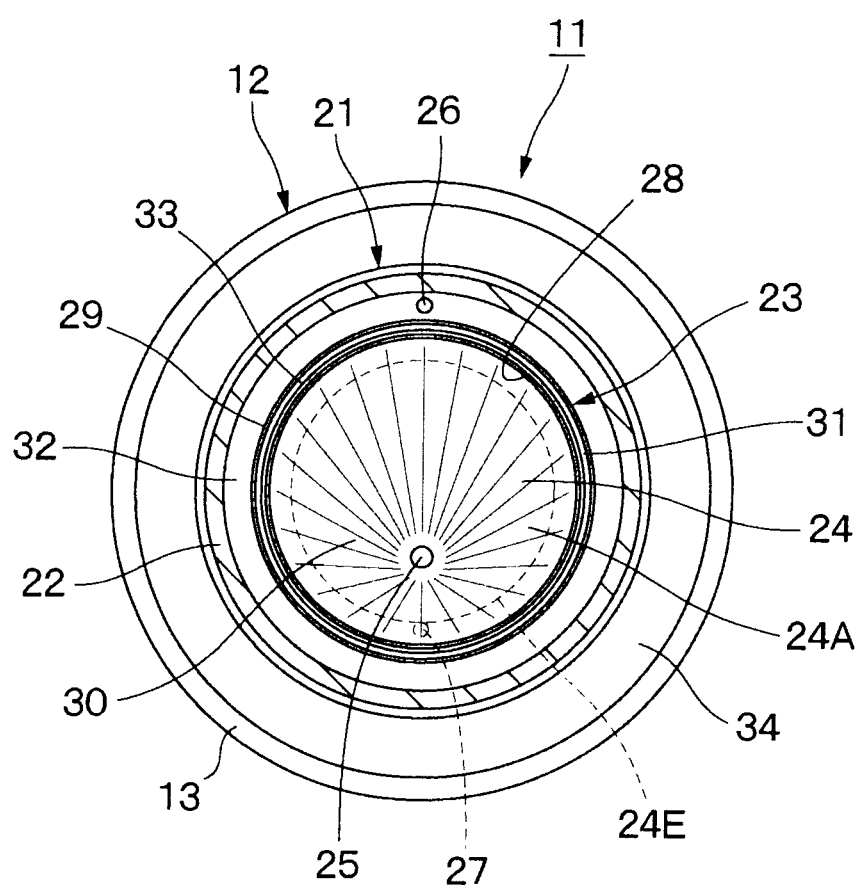
FIG. 5 is a transverse sectional view taken from the direction of arrows V-V in FIG. 4.

Namely, designated at 11 is the cartridge assembly which is detachably mounted in the cartridge mounting recess 2B of the housing 2 for constituting the coating apparatus 1. A plurality of cartridge assemblies 11 are prepared on, for example, a filling base (not shown) of a paint filling apparatus for replacement purposes. As shown in FIGS. 2 and 3, the cartridge assembly 11 is largely constituted by a cartridge mounting member 12 and a paint cartridge 21 which will be described hereinafter.

Denoted at 12 is the cartridge mounting member of the cartridge assembly 11. This cartridge mounting member 12 has a below-described mounting base 13 formed in a short cylindrical shape, and the front side with this mounting base 13 is formed as a feed tube 14, while the rear side is formed as a support portion 16.

Indicated at 13 is the mounting base of the cartridge mounting member 12, and the mounting base 13 is fitted in the cartridge mounting recess 2B of the housing 2. This mounting base 13 is formed in a short cylindrical shape, and a valve member receptacle space 13A for accommodating a below-described paint valve 17 is formed in its central portion. Here, a mounting member side paint passage 15, a mounting member side extruding liquid passage 18, a mounting member side atmosphere passage 19, and the like, which will be described hereinafter, are formed in the mounting base 13.

When the cartridge assembly 11 is mounted to the coating apparatus 1, the mounting base 13 is mounted in the cartridge mounting recess 2B of the housing 2 in a fitted state, and when the cartridge assembly 11 is mounted to the paint filling apparatus, the mounting base 13 is mounted in a cartridge mounting portion (not shown) of the filling base in a fitted state.

Indicated at 14 is the feed tube which is provided in such a manner as to extend coaxially from the mounting base 13 toward the axial front side. The below-described mounting member side paint passage 15 is formed inside this feed tube 14, and a valve seat 14A is provided in the interior of its fore distal end. Here, the feed tube 14 causes the paint, which is supplied from a below-described paint chamber 30, to flow from its distal end toward the rotary atomizing head 5 through the mounting member side paint passage 15. In addition, the feed tube 14 is used as a filling port for paint, and it is possible to fill the paint into the paint chamber 30 from the feed tube 14.

Indicated at 15 is the mounting member side paint passage provided in the feed tube 14. As for this paint passage 15, its rear side, which is an upstream side, is open at a bottom surface 16A of the below-described support portion 16, and communicates with the paint chamber 30 through a tank side paint passage 25 of a tank base 24. Meanwhile, its front side constituting the downstream side is open at a fore distal end of the feed tube 14. Consequently, the mounting member side paint passage 15 is able to cause the paint accommodated in the paint chamber 30 to flow out from the distal end of the feed tube 14.

Indicated at 16 is the support portion provided on the rear side of the mounting base 13. The support portion 16 is formed as a short tubular body which projects coaxially from the mounting base 13 toward the axial rear side and has an external thread formed on its outer peripheral side. The bottom surface 16A (rear surface portion of the mounting base 13), which is located in an innermost portion of the support portion 16, is formed substantially flatly. Further, an open end portion 22A of a below-described tank accommodating cylindrical body 22 is inserted and fitted to the inner side of the support portion 16, and a retainer ring 34 is threadedly secured to its outer side.

Indicated at 17 is the paint valve provided in the mounting base 13, and the paint valve 17 is formed as a normally closed valve. Here, the paint valve 17 is largely constituted by a piston 17A which is inserted and fitted in the valve member receptacle space 13A of the mounting base 13 movably in the axial direction; an elongated valve body 17B which has a proximal end side fixed to the piston 17A and a distal end side extending axially to the fore distal end side of the feed tube 14, and which is moved away from and seated on the valve seat 14A; a valve spring 17C for urging the piston 17A in the closing direction of the valve body 17B; and a pressure receiving chamber 17D formed on an opposite side to the valve spring 17C with the piston 17A located therebetween.

Further, as the valve body 17B is normally seated on the valve seat 14A by the urging force of the valve spring 17C, the paint valve 17 shuts off the mounting member side paint passage 15 within the feed tube 14. Meanwhile, when pilot air is supplied to the pressure receiving chamber 17D, the piston 17A is displaced against the valve spring 17C, thereby making it possible to open the valve body 17B and allow the mounting member side paint passage 15 to communicate.

Indicated at 18 is the mounting member side extruding liquid passage provided in the mounting base 13. This extruding liquid passage 18 connects a below-described extruding liquid chamber 32 to the housing side extruding liquid passage 7, and its one end is open at a front surface of the mounting base 13 at a position for communicating with the housing side extruding liquid passage 7. A check valve 18A which opens at the time of mounting to the housing 2 is provided on a front surface side of this mounting member side extruding liquid passage 18. The other end of the mounting member side extruding liquid passage 18 is open at the bottom surface 16A of the support portion 16 which is a rear surface of the mounting base 13.

Indicated at 19 is the mounting member side atmosphere passage provided in the mounting base 13, and the mounting member side atmosphere passage 19 is adapted to make a below-described annular gap space 31 open to the atmosphere (outside). The mounting member side atmosphere passage 19 has one end communicating with a tank side atmosphere passage 27 of the below-described tank base 24 and the other end open at an outer peripheral surface of the mounting base 13. In this instance, as shown in FIG. 1, when the cartridge assembly 11 is mounted in the cartridge mounting recess 2B of the housing 2, the outer opening of the mounting member side atmosphere passage 19 is open at a position where it is not blocked by a portion of the housing 2.

Further, the mounting member side atmosphere passage 19 is able to exhaust the air within the annular gap space 31 to the outside in cooperation with the tank side atmosphere passage 27. Consequently, when the extruding liquid is caused to flow in, the paint in the paint chamber 30 can be pressed in a state in which an inner bag 28 and an outer bag 29 are close to each other, thereby making it possible to accurately supply the paint. On the other hand, when the below-described inner bag 28 has broken and the paint in the paint chamber 30 has leaked to the annular gap space 31, or when the outer bag 29 has broken and the extruding liquid in the extruding liquid chamber 32 has leaked to the annular gap space 31, the mounting member side atmosphere passage 19 serves as an efflux port for allowing this paint or extruding liquid to flow from the broken portion to the outside.

Next, the paint cartridge 21 in accordance with the first embodiment which constitutes the cartridge assembly 11 together with the cartridge mounting member 12 will be described below.

Namely, designated at 21 is the paint cartridge which is detachably provided on the cartridge mounting member 12. This paint cartridge 21 stores a predetermined amount of paint which is used for coating. The paint cartridge 21 is a cartridge which is used in the case where only the paint of the same coating color, such as a paint of an exclusive color, an undercoat paint, and a rust preventive paint, is applied.

Figure 6:
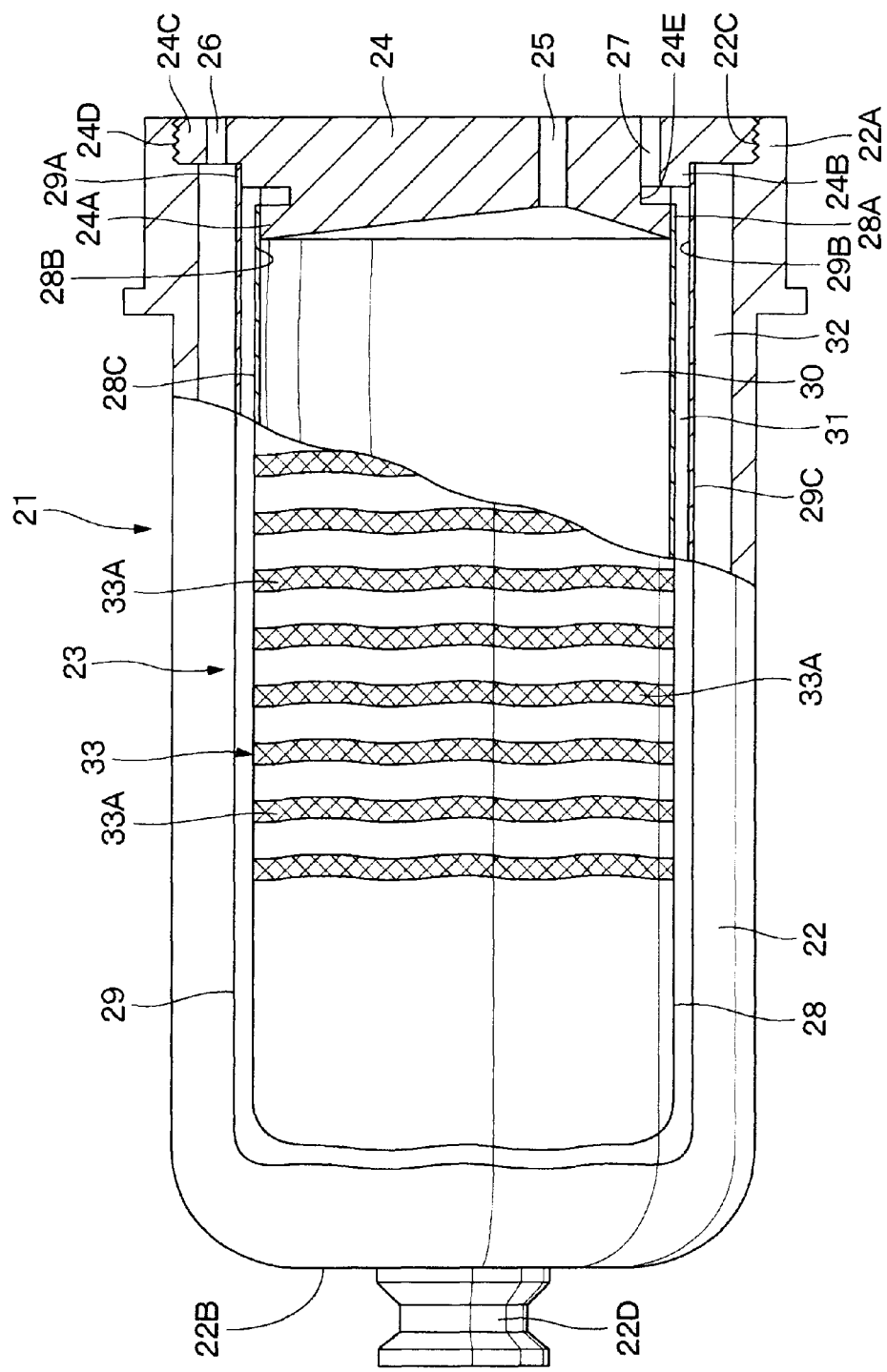
FIG. 6 is a fragmentary external view illustrating a tank accommodating cylindrical body, a tank base, an inner bag, and an outer bag of the paint cartridge which is partly cut away.

Here, as shown in FIGS. 3, 6, and the like, the paint cartridge 21 is constituted by the tank accommodating cylindrical body 22, a baggy tank 23, the paint chamber 30, the annular gap space 31, the extruding liquid chamber 32, a detector 33, and the like, which will be described hereinafter.

Figure 8:
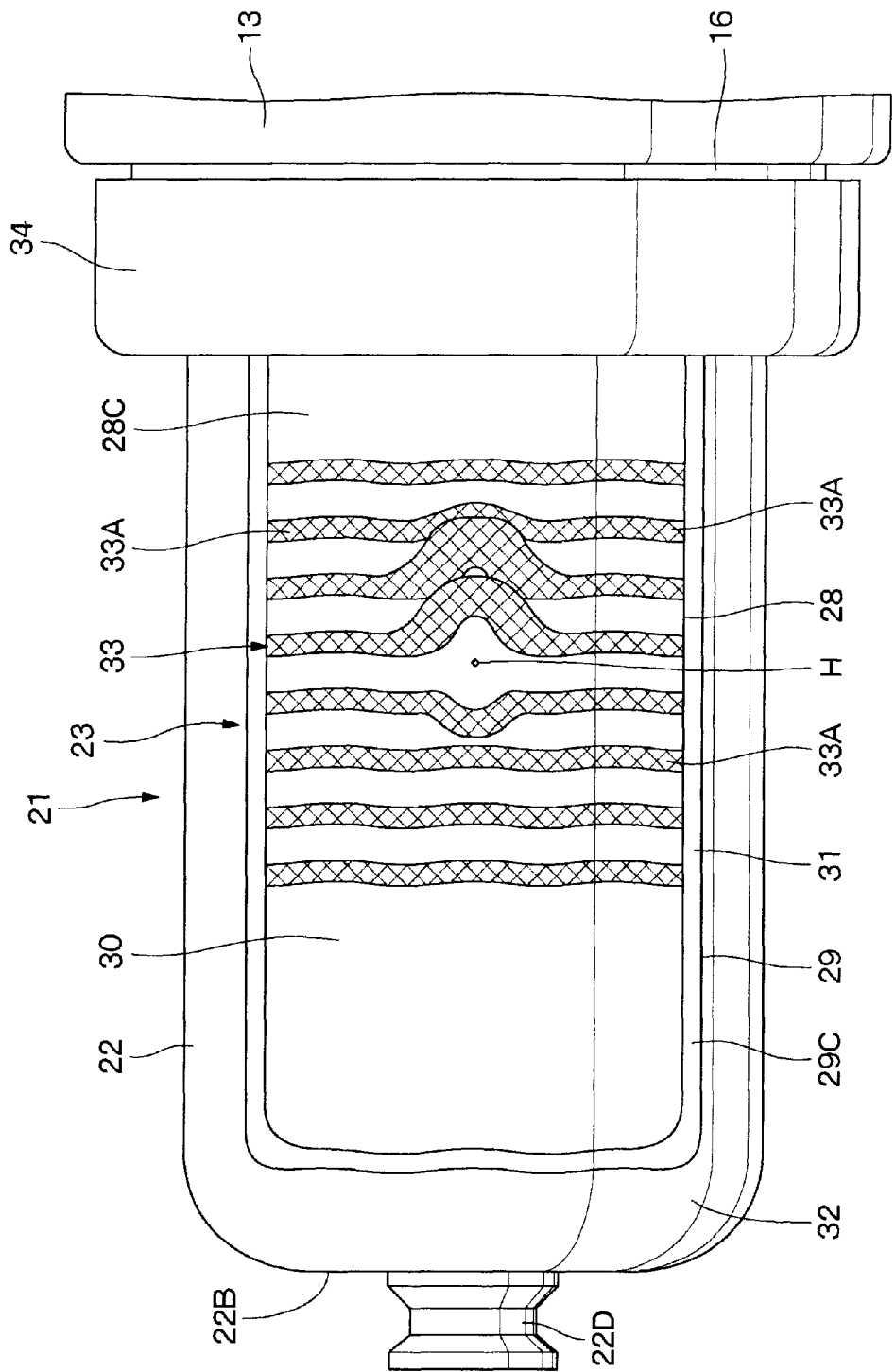
FIG. 8 is an enlarged external view of an essential portion, taken from the outer side of the tank accommodating cylindrical body, illustrating a state in which the pattern of a detector has been changed by a leaked paint.

Denoted at 22 is the tank accommodating cylindrical body which forms the outer shell of the paint cartridge 21. This tank accommodating cylindrical body 22 is formed of a hollow tubular body which forms a space of a predetermined volume around the below-described baggy tank 23, and is detachably mounted on the support portion 16 of the cartridge mounting member 12. As shown in FIG. 6 and FIG. 8, the tank accommodating cylindrical body 22 is formed of, for example, a transparent or translucent resin material, specifically an acrylic resin, a polyvinyl chloride resin, a polyester resin, a polyamide (PA), a polyimide (PI), a polyarylate (PAR), a polycarbonate (PC), a fluororesin (FR), a cyclic olefin copolymer (COC), or the like so that the state of the baggy tank 23 and the detector 33 can be visually confirmed from the outside.

As for the tank accommodating cylindrical body 22, its front side is enlarged in diameter to form the thick-walled open end portion 22A, and its rear side is closed by a bottom portion 22B. In consequence, the tank accommodating cylindrical body 22 is formed in a bottomed tubular shape. An internally threaded portion 22C, which engages with an externally threaded portion 24D of the below-described tank base 24, is formed on the inner side of a distal end portion of the open end portion 22A. Meanwhile, a stepped cylindrical grip portion 22D is formed at the center of the bottom portion 22B in such a manner as to project rearwardly, and the grip portion 22D is for gripping the coating apparatus 11 when it is carried.

Next, a description will be given of the baggy tank 23 in accordance with the first embodiment which partitions the interior of the paint cartridge 21 into the space for accommodating the paint and the space for accommodating the extruding liquid.

Figure 7:
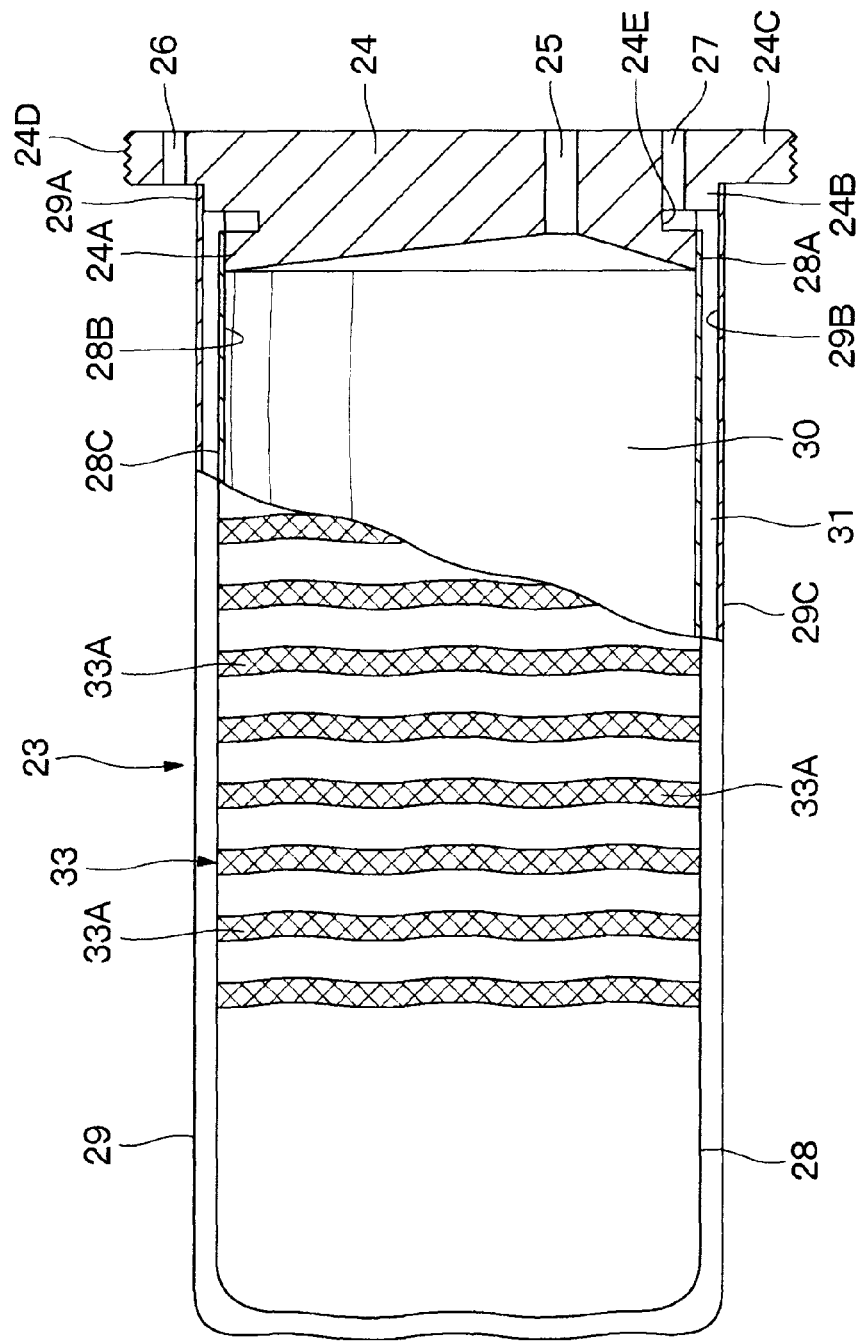
FIG. 7 is a fragmentary external view illustrating a baggy tank as a single unit which is partly cut away.

Denoted at 23 is the baggy tank provided in the tank accommodating cylindrical body 22, and the baggy tank 23 defines the paint chamber 30 and the extruding liquid chamber 32 which will be described hereinafter. As shown in FIG. 7, the baggy tank 23 is constituted by the tank base 24, the tank side paint passage 25, a tank side extruding liquid passage 26, the tank side atmosphere passage 27, the inner bag 28, the outer bag 29, the detector 33, and the like, which will be described hereinafter.

Indicated at 24 is the tank base provided at the open end portion 22A of the tank accommodating cylindrical body 22, and the tank base 24 is formed in the shape of a short stepped disk which closes the open end portion 22A. Specifically, its rear side close to the paint chamber 30 is formed as a small-diameter portion 24A, while its front side located away from the paint chamber 30 is formed as a large-diameter portion 24B. A flange portion 24C which is further enlarged in diameter is formed at a front side position of the large-diameter portion 24B, and the externally threaded portion 24D is formed on the outer periphery of that flange portion 24C.

Consequently, the tank base 24 is able to form a hermetically closed container together with the tank accommodating cylindrical body 22 as its externally threaded portion 24D is threadedly secured to the internally threaded portion 22C of the tank accommodating cylindrical body 22 while its small-diameter portion 24A is being inserted into the open end portion 22A of the tank accommodating cylindrical body 22.

The rear end face of the small-diameter portion 24A is a gently concave conical surface, and the below-described tank side paint passage 25 is provided in its deepest portion axially in a penetrating manner. The below-described tank side extruding liquid passage 26 is provided in the outer peripheral side of the tank base 24 axially in a penetrating manner. Further, the tank base 24 has an annular recessed groove 24E formed at the step portion between the small-diameter portion 24A and the large-diameter portion 24B, and the recessed groove 24E communicates with the mounting member side atmosphere passage 19 of the cartridge mounting member 12 through the below-described tank side atmosphere passage 27.

Indicated at 25 is the tank side paint passage provided in the tank base 24. This paint passage 25 is provided in the deepest portion of the gently concave conical surface of the small-diameter portion 24A axially in a penetrating manner, and allows the below-described paint chamber 30 and the mounting member side paint passage 15 to communicate with each other. In consequence, the tank side paint passage 25, together with the mounting member side paint passage 15, allows the efflux and influx of the paint between the paint chamber 30 and the outside of the tank accommodating cylindrical body 22.

Indicated at 26 is the tank side extruding liquid passage provided in the flange portion 24C of the tank base 24. The extruding liquid passage 26 is located on the outer peripheral side of the large-diameter portion 24B and penetrates in the axial direction. In this case, as the tank side extruding liquid passage 26 allows the below-described extruding liquid chamber 32 and the mounting member side extruding liquid passage 18 to communicate with each other, the arrangement provided is such that the influx and efflux of the extruding liquid is made possible between the extruding liquid chamber 32 and an extruding liquid supplying device (not shown) of the outside of the tank accommodating cylindrical body 22.

Indicated at 27 is the tank side atmosphere passage provided in the tank base 24, and the atmosphere passage 27 extends from the recessed groove 24E of the tank base 24 to the front surface side and is open thereat. Further, the tank side atmosphere passage 27 makes the annular gap space 31 open to the atmosphere (outside) through the mounting member side atmosphere passage 19.

Meanwhile, as also described with respect to the mounting member side atmosphere passage 19, by causing the air in the annular gap space 31 to flow out to the outside, the tank side atmosphere passage 27 allows the extruding liquid to press the paint in the paint chamber 30 in a state in which the inner bag 28 and the outer bag 29 are brought close to each other. Also, when the inner bag 28 has broken and the paint in the paint chamber 30 has leaked to the annular gap space 31, or when the outer bag 29 has broken and the extruding liquid in the extruding liquid chamber 32 has leaked to the annular gap space 31, the tank side atmosphere passage 27 serves as an efflux port for allowing this paint or extruding liquid to flow from the broken portion to the outside.

Denoted at 28 is the inner bag mounted on the tank base 24 by being located within the tank accommodating cylindrical body 22. Meanwhile, denoted at 29 is the outer bag which is formed a size larger than the inner bag 28 and mounted on the tank base 24 in such a manner as to cover the inner bag 28. The inner bag 28 and the outer bag 29 are constructed as a bottomed bag of a dual structure with its rear side closed.

The inner bag 28 and the outer bag 29 are formed in film form by using a resin material possessing chemical resistance with which they are not affected by the paint and the extruding liquid and flexibility with which they are difficult to be broken by repeated bending, for example, polyethylene (PE), nylon, preferably low density polyethylene (LDPE), linear low density polyethylene (LLDPE), or the like. In this case, a transparent material is used as the resin material of each of the above-described inner bag 28 and outer bag 29 so that the interior can be visually observed.

As for the inner bag 28, its front end is formed as an opening 28A, and its inner surface 28B on this opening 28A side is air- and liquid-tightly secured the outer peripheral surface of the small-diameter portion 24A of the tank base 24. In consequence, the inner bag 28 in cooperation with the tank base 24 defines in its inner space the below-described paint chamber 30 for accommodating the paint. The below-described detector 33 is provided on an outer surface 28C of the inner bag 28.

Meanwhile, as for the outer bag 29, its front end is formed as an opening 29A, and its inner surface 29B on this opening 29A side is air- and liquid-tightly secured the outer peripheral surface of the large-diameter portion 24B of the tank base 24. In consequence, the outer bag 29 defines the below-described annular gap space 31 between its inner surface 29B and the outer surface 28C of the inner bag 28. In addition, the outer surface 29C of the outer bag 29 defines the below-described extruding liquid chamber 32 between the same and the tank accommodating cylindrical body 22.

It should be noted that, in the drawings, the inner bag 28 and the outer bag 29 are shown in a state in which they are mutually spaced apart in their entirety in order to clearly show the annular gap space 31. However, the inner bag 28 and the outer bag 29 are normally close to each other by being sandwiched by the inner paint and the outer extruding liquid, and function as passages for allowing the leaked paint or extruding liquid to circulate only when the inner bag 28 or the outer bag 29 has broken.

Denoted at 30 is the paint chamber which is defined in the interior of the inner bag 28. This paint chamber 30 accommodates the coating paint which is supplied toward the rotary atomizing head 5, and communicates with each of the paint passages 15 and 25. Here, the maximum volume of the paint chamber 30 (i.e., the interior volume of the inner bag 28) is set to a greater volume than, for example, the inner space volume of the tank accommodating cylindrical body 22 which is defined by the tank accommodating cylindrical body 22 and the tank base 24 when the tank base 24 is mounted to the tank accommodating cylindrical body 22, namely, than the volume for defining the below-described extruding liquid chamber 32.

In consequence, even if a situation has occurred in which a large amount of paint is filled into the paint chamber 30 by mistake, the inner bag 28 can be abutted against the inner surface of the tank accommodating cylindrical body 22 before a load is applied to the inner bag 28 and the deterioration of the inner bag 28 and the like can be prevented.

Denoted at 31 is the annular gap space 31 defined between the outer surface 28C of the inner bag 28 and the inner surface 29B of the outer bag 29. This annular gap space 31 is for allowing the paint, which has leaked when the inner bag 28 has broken or the extruding liquid which has leaked when the outer bag 29 has broken, to circulate from the recessed groove 24E of the tank base 24 toward the tank side atmosphere passage 27. In this case, since the recessed groove 24E is provided on the side of the opening 28A of the inner bag 28 and the opening 29A of the outer bag 29, the paint which has leaked when the inner bag 28 has broken or the extruding liquid which has leaked when the outer bag 29 has broken flows through the annular gap space 31 toward the side of the openings 28A and 29A.

Denoted at 32 is the extruding liquid chamber, and this extruding liquid chamber 32 is defined between the tank accommodating cylindrical body 22 and the outer bag 29 when the baggy tank 23 and the tank accommodating cylindrical body 22 are mounted to the cartridge mounting member 12. The extruding liquid chamber 32 communicates with the mounting member side extruding liquid passage 18 of the cartridge mounting member 12 through the tank side extruding liquid passage 26 of the tank base 24. Further, when the paint is supplied toward the rotary atomizing head 5, the extruding liquid flows into the extruding liquid chamber 32 through the extruding liquid passages 18 and 26, and when the paint is filled into the paint chamber 30, the extruding liquid in the extruding liquid chamber 32 is discharged through the extruding liquid passages 18 and 26.

Next, a description will be given of the detector 33 in accordance with the first embodiment which is provided on, for instance, the outer surface 28C of the inner bag 28 in order to detect the breakage of the inner bag 28 and the outer bag 29.

Designated at 33 is the detector provided on the outer surface 28C of the inner bag 28 for constituting the baggy tank 23. This detector 33 has a hue of color different from the coating color of the paint within the paint chamber 30, and changes its pattern owing to contact with the paint or the extruding liquid. In this case, the pattern of the detector 33 is a line drawing or color coding formed on the outer surface 28C of the inner bag 28, and in the first embodiment the detector 33 is formed into a striped pattern by arranging a plurality of color belts 33A at intervals in the longitudinal direction of the respective bags 28 and 29.

The explanation is made on the first embodiment by taking a case of a coating line in which only a specific paint is applied, for example, a coating line in which a paint of the same coating color is sprayed as in coating of an exclusive color, undercoating, anticorrosive coating, and the like, as an example. For this reason, the hue of color of the detector 33 is set to an opposite color to the coating color of the paint accommodated in the paint chamber 30 or a hue close to the opposite color. As examples, the color of the detector 33 is set to black or a hue close to black in the case of a white paint or a clear paint, or green or a hue close to green in the case of a red paint. As a result, the detector 33 can be made noticeable in contrast to the paint accommodated in the paint chamber 30.

Here, the material used for the color belts 33A is a material which dissolves due to contact with a water-based, a solvent-based, or other similar paint and an extruding liquid such as pure water, an organic solvent, or the like, or which is deformed, flows, or scatters due to contact with the paint or the extruding liquid.

Namely, the following materials (1) to (7) are suitably used as the materials for the color belts 33A.

(1) A colored water-based ink or a water-based fluorescent ink which is capable of being applied to the baggy tank.
(2) A colored oil-based ink or an oil-based fluorescent ink which is capable of being applied to the baggy tank.
(3) A coloring ink in which a pigment is kneaded with a starch, a gelatin, a glue, or the like.
(4) A single-sided adhesive tape on the surface of which a pigment is applied or with which a pigment is kneaded.
(5) A colored plastic film.
(6) Capsules in which a colored powder is accommodated inside an outer shell formed of a starch, a gelatin, a glue, or the like.
(7) A colored powder which is capable of being applied.

Thus, the color belts 33A consisting of the above-described materials (1) to (3) are applied, printed, or transferred as an ink onto the outer surface 28C of the inner bag 28 or the inner surface 29B of the outer bag 29. Next, the color belts 33A consisting of the materials (4), (5), and (7) are bonded as an adhesive tape, a plastic film, or a colored powder. Further, the capsules in (6) are disposed in the annular gap space 31 between the bags 28 and 29.

Further, the color belts 33A of the detector 33 consisting of an ink, a tape, a film, a powder, or the like have the function of undergoing a change in their initially depicted pattern by becoming dissolved, flowing, or scattering due to the contact with a water-based paint, a solvent-based paint, or pure water or an organic solvent such as a thinner which is used as the extruding liquid.

Here, in the first embodiment, a description will be given by citing as an example a case in which the color belts 33A of the detector 33 are formed by a water-based ink among the materials described in above (1) to (7). In this instance, the water-based ink is expressed on the outer surface 28C of the inner bag 28 by such means of printing, transfer, application, or the like.

Thus, the color belts 33A of the detector 33 are formed in the form of strips by using a water-based ink as a material. As a result, as shown in FIG. 8, in the event that a longitudinally intermediate portion or its vicinity of the inner bag 28 has broken and a hole H has been formed, the paint in the paint chamber 30 leaks to the annular gap space 31 through the hole H. Then, the paint which flowed from the hole H into the annular gap space 31 flows through the recessed groove 24E of the tank base 24 toward the atmosphere passages 27 and 19. At this time, since the color belts 33A of the detector 33 are provided on the outer surface 28C of the inner bag 28 in such a manner as to obstruct the flow of the paint flowing through the annular gap space 31, this paint is brought into contact with the color belts 33A. In consequence, the color belts 33A are dissolved by the paint and are thereby able to change the orderly arranged striped pattern.

It should be noted that indicated at 34 is the retainer ring for detachably mounting the paint cartridge 21 to the support portion 16 of the cartridge mounting member 12. This retainer ring 34 is detachably secured threadedly to the support portion 16 in a state of being engaged with the stepped portion provided at the open end portion 22A of the tank accommodating cylindrical body 22.

The coating system using the paint cartridge 21 according to the first embodiment has the aforementioned construction, and next, the coating operation using the paint cartridge 21 will be explained.

When a coating operation is performed, as shown in FIG. 1, the cartridge assembly 11 in which the paint cartridge 21 with the paint filled in its paint chamber 30 is fitted is mounted to the cartridge mounting recess 2B of the housing 2. In this state, the extruding liquid valve 8 and the paint valve 17 are opened. As a result, the extruding liquid is supplied into the extruding liquid chamber 32 through the extruding liquid passages 7, 18, and 26, and the outer bag 29 and the inner bag 28 are pressed by this extruding liquid to thereby reduce the paint chamber 30. In consequence, the paint within the paint chamber 30 is discharged from the distal end of the feed tube 14 toward the rotary atomizing head 5 through the paint passages 25 and 15.

At this time, the paint is charged to a high voltage by a high voltage generator. Consequently, the paint discharged from the feed tube 14 flies along electric lines of force formed with respect to the work piece while being atomized by the rotary atomizing head 5, and is deposited onto the work piece.

Then, as for the baggy tank 23 of the coating cartridge 21, its inner bag 28 and outer bag 29 have the risk of becoming broken due to the filling and discharging of the paint. Accordingly, a description will be given of a method of detecting that the inner bag 28 and the outer bag 29 have broken due to aged deterioration.

As shown in FIG. 8, if a longitudinally intermediate portion or its vicinity of the inner bag 28 breaks and the hole H is formed, the paint leaks from the paint chamber 30 to the annular gap space 31 through the hole H. Then, the paint which flowed from the hole H into the annular gap space 31 flows to the recessed groove 24E of the tank base 24 communicating with the atmosphere passages 27 and 19. At this time, the paint comes into contact with and dissolves the color belts 33A forming the detector 33 provided on the outer surface 28C of the inner bag 28, to thereby change the striped pattern of these color belts 33A. Therefore, by visually observing the change in the pattern of the color belts 33A from the outside through the transparent tank accommodating cylindrical body 22, the operator is able to discern at an early stage that the inner bag 28 or the outer bag 29 has broken.

As such, according to the first embodiment, the arrangement provided is such that the plurality of color belts 33A of the detector 33 are juxtaposed to each other on the outer surface 28C of the inner bag 28 of the baggy tank 23 so as to depict a striped pattern, and these color belts 33A are visually observable from the outside through the tank accommodating cylindrical body 22 and cause the striped pattern to change due to their contact with the paint or the extruding liquid.

Accordingly, when the inner bag 28 or the outer bag 29 has broken and the hole H has been formed, and the paint or the extruding liquid has leaded into the annular gap space 31, the paint or the extruding liquid which leaked into the annular gap space 31 is brought into contact with the color belts 33A of the detector 33, thereby making it possible to cause the striped pattern made by the color belts 33A to change. Consequently, the operator who performs an inspection operation is able to recognize the breakage of the inner bag 28 or the outer bag 29 by visually inspecting from the outside through the tank accommodating cylindrical body 22 whether or not the detector 33 has changed.

As a result, even in a case where a transparent clear paint is accommodated in the paint chamber 30 or transparent pure water or solvent is accommodated in the extruding liquid chamber 32, the breakage of the inner bag 28 or the outer bag 29 can be reliably recognized at an early stage by merely visually observing through the tank accommodating cylindrical body 22 whether or not the pattern of the detector 33 provided on the baggy tank 23 has changed. It is thereby possible to suppress a decline in the coating quality and improve reliability.

Further, in the first embodiment, a water-based ink is used as the color belts 33A of the detector 33, and its hue of color is set to a hue different from the coating color of the paint within the paint chamber 30. Therefore, the detector 33 can be made noticeable with respect to the paint, and are able to clearly show a change in the pattern at the time of coming into contact with the paint or the extruding liquid.

In addition, the color belts 33A of the detector 33 can be easily provided on the inner bag 28 of the baggy tank 23 by such means as printing, transfer, application, or the like.

Furthermore, since the color belts 33A of the detector 33 are disposed in such a manner as to intersect the flowing direction of the paint or the extruding liquid flowing through the annular gap space 31 toward the atmosphere passages 27 and 19, the color belts 33A can be reliably brought into contact with the paint or the extruding liquid. In addition, the color belts 33A of the detector 33 are able to greatly change their pattern when the paint or the extruding liquid has come into contact with them.

Figure 9:
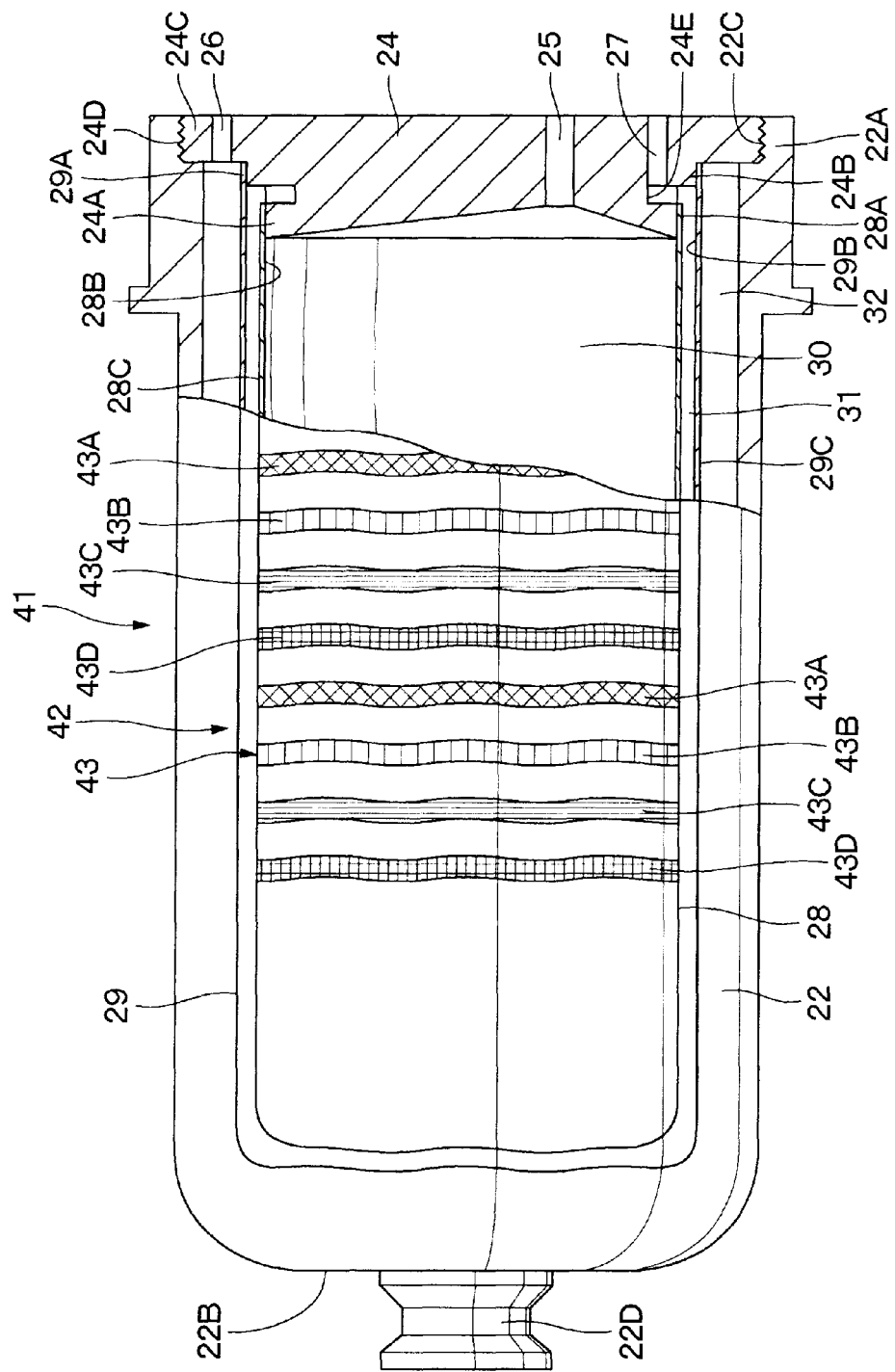
FIG. 9 is a fragmentary external view illustrating the tank accommodating cylindrical body, the tank base, the inner bag, and then outer bag of the paint cartridge in accordance with a second embodiment which is partly cut away.

Next, FIG. 9 shows a second embodiment according to the present invention. The present embodiment is characterized in that a plurality of kinds of color belts of different hues are provided as the detector. It should be noted that, in the second embodiment, the component elements that are identical to those of the foregoing first embodiment will be simply denoted by the same reference numerals to avoid repetitions of similar explanations.

In FIG. 9, designated at 41 is a paint cartridge in accordance with the second embodiment, and denoted at 42 is a baggy tank of the paint cartridge 41. Designated at 43 is a detector in accordance with the second embodiment which is provided on the inner bag 28 of the baggy tank 42. In substantially the same way as the detector 33 in accordance with the first embodiment, this detector 43 is formed into a striped pattern by a plurality of color belts 43A to 43D arranged at intervals in the longitudinal direction of the inner bag 28. However, the detector 43 in accordance with the second embodiment differs from the detector 33 in accordance with the first embodiment in that the hues of the color belts 43A to 43D are different.

Here, in substantially the same way as the first embodiment, the second embodiment illustrates a case in which the color belts 43A to 43D of the detector 43 are formed by water-based inks among a plurality of materials. The color belts 43A to 43D are formed by using as their materials water-based inks having different hues. These water-based inks are expressed on the outer surface 28C of the inner bag 28 by such means of printing, transfer, application, or the like.

Further, for example, the color belts 43A to 43D of the detector 43 are formed by using inks of four different colors, and these four colors are arranged in two stages. In addition, the hues of the color belts 43A to 43D are set to white, red, blue, and yellow as an example. These four colors are such as to be able to render the color belts of one hue noticeable with respect to a paint of any coating color.

As such, the second embodiment can also obtain the substantially same effect as that of the first embodiment mentioned before. Particularly in the second embodiment, the detector 43 is formed by a plurality of kinds of color belts 43A to 43D whose hues are different. Accordingly, even in the case of a general-purpose cartridge for which the coating color (coloring) of the paint accommodated in the paint chamber 30 is not fixed, one kind of the color belts 43A to 43D can be made noticeable with respect to the paint. As a result, the baggy tank 42 can be formed as a general-purpose product for coping with various paints.

Figure 10:
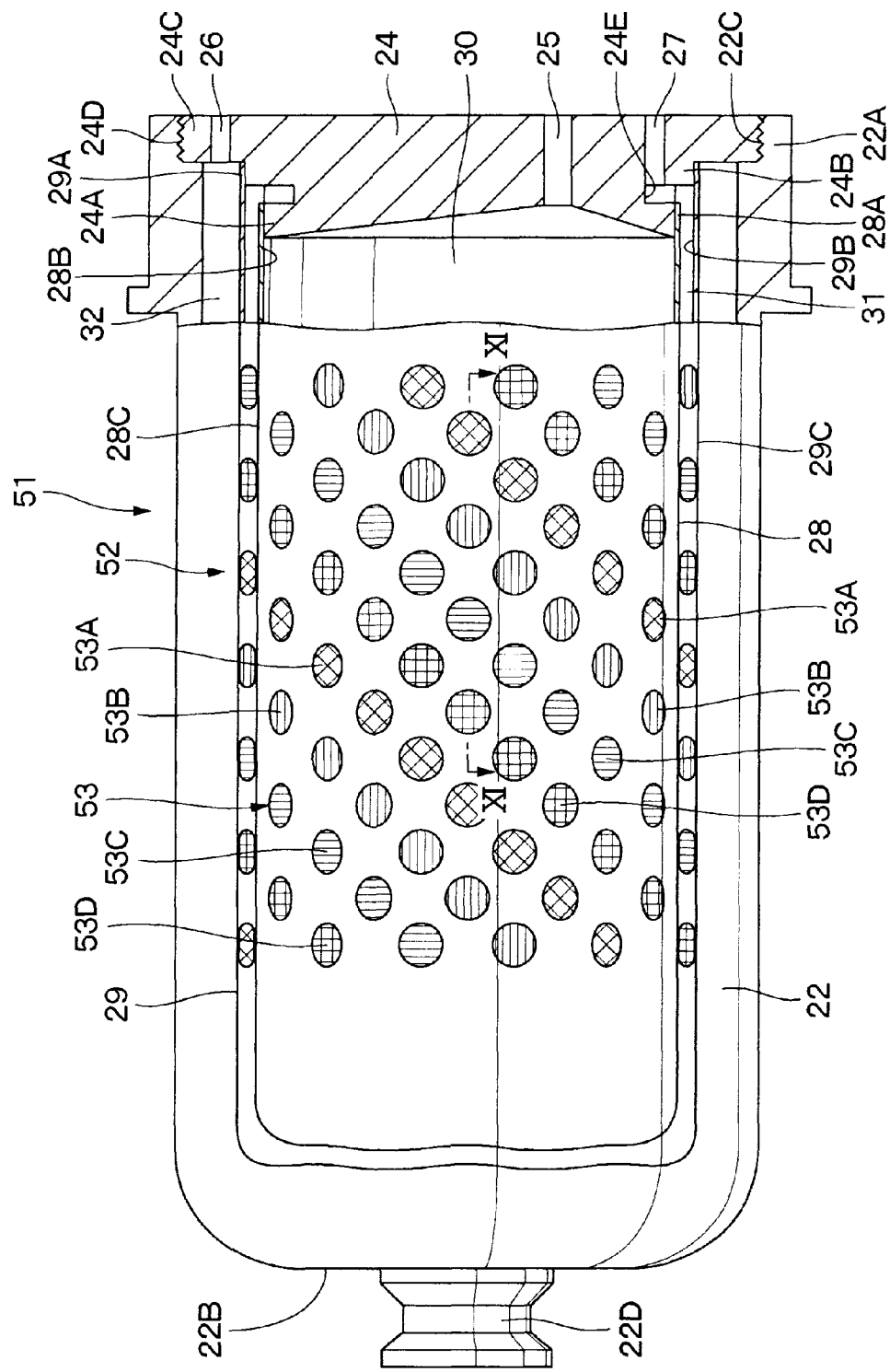
FIG. 10 is a fragmentary external view illustrating the tank accommodating cylindrical body, the tank base, the inner bag, and then outer bag of the paint cartridge in accordance with a third embodiment, which is partly cut away.
Figure 11:
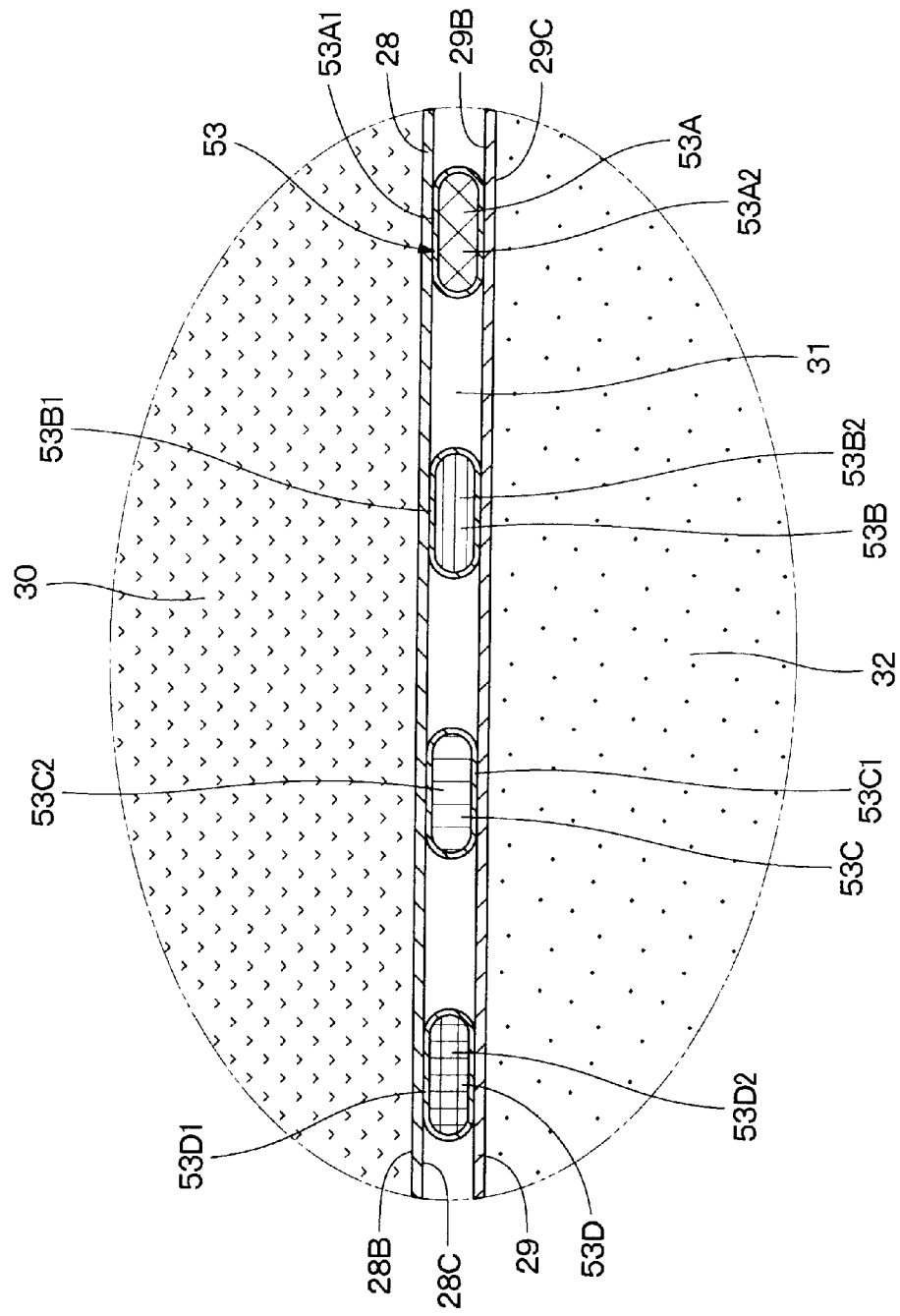
FIG. 11 is an enlarged sectional view of an essential portion, taken in the direction of arrows XI-XI in FIG. 10, of the inner bag, the outer bag, and capsular detectors.
Figure 12:
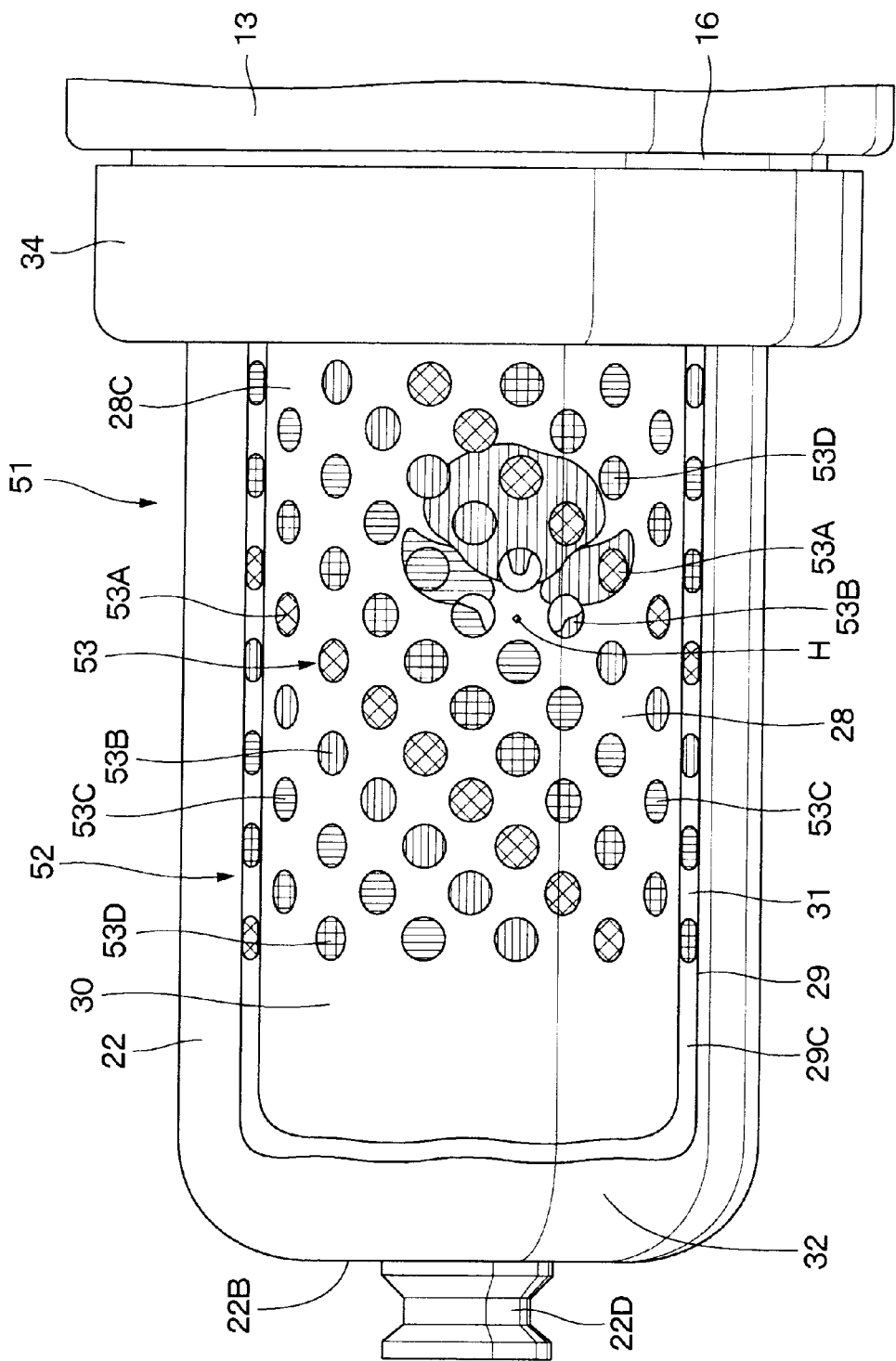
FIG. 12 is an enlarged external view of an essential portion, taken from the outer side of the tank accommodating cylindrical body, illustrating a state in which outer shells are dissolved by the leaked paint, and the shape of the capsular detectors have been thereby changed.

Next, FIGS. 10 to 12 show a third embodiment in accordance with the present invention. The present embodiment is characterized in that the material of the detector is a plurality of capsules provided in the space between the inner bag and the outer bag, and each of the capsules is constituted by an outer shell which is dissolvable by a paint and an extruding liquid and by a detecting powder accommodated in the outer shell. It should be noted that, in the third embodiment, the component elements that are identical to those of the foregoing first embodiment will be simply denoted by the same reference numerals to avoid repetitions of similar explanations.

In FIG. 10, designated at 51 is a paint cartridge in accordance with the third embodiment, and denoted at 52 is a baggy tank of the paint cartridge 51. Designated at 53 is a capsular detector in accordance with the third embodiment which is provided in the baggy tank 52. This capsular detector 53 is provided in the annular gap space 31 between the outer surface 28C of the inner bag 28 and the inner surface 29B of the outer bag 29. The capsular detector 53 is formed by a plurality of kinds of powder capsules 53A to 53D, and these powder capsules 53A to 53D are arranged obliquely at predetermined intervals. In this instance, the powder capsules 53A to 53D in terms of their arrangement may be arranged in a lateral direction or a vertical direction, or may be arranged irregularly.

It should be noted that the powder capsules 53A to 53D of the capsular detector 53 partition the space by their outer surfaces, and as these outer surfaces are dissolved by the paint or the extruding liquid, the contents are caused to flow out to effect a change in shape.

In this case, as shown in FIG. 11, the powder capsule 53A for constituting the capsular detector 53 consists of an outer shell 53A1 formed as a flat baggy closed container by using a material which is dissolvable by both water and a solvent, such as a starch, a gelatin, a glue, or the like, and a detecting color powder 53A2 as a material which is accommodated inside the outer shell 53A1 and scatters by a liquid. Similarly, the other powder capsules 53B to 53D also consist of dissolvable outer shells 53B1 to 53D1 and color powders 53B2 to 53D2 accommodated inside the outer shells 53B1 to 53D1.

Here, the color powders 53A2 to 53D2 which are accommodated in the powder capsules 53A to 53D are set to powders of four different colors, for example, white, red, blue, and yellow. As also mentioned in the second embodiment, these four colors are such as to be able to render one of their colors noticeable with respect to a paint of any color.

As such, as shown in FIG. 12, when the inner bag 28 or the outer bag 29 breaks and the hole H is formed, the paint or the extruding liquid leaks to the annular gap space 31. At this time, as the outer shells 53A1 to 53D1 are dissolved upon contacting the paint or the extruding liquid, the powder capsules 53A to 53D for constituting the capsular detector 53 release the inner color powders 53A2 to 53D2 into the annular gap space 31.

As a result, the powder capsules 53A to 53D undergo a change in their outer shape, and the hue inside the annular gap space 31 changes, so that the operator is able to recognize the breakage of the inner bag 28 or the outer bag 29 by visually observing these changes in shape and hue from the outside through the tank accommodating cylindrical body 22.

As such, the third embodiment can also obtain the substantially same effect as that of the first embodiment mentioned before. Particularly in the third embodiment, when the inner bag 28 or the outer bag 29 has broken, the powder capsules 53A to 53D are dissolved by the leaked paint or extruding liquid to thereby allow the color powders 53A2 to 53D2 to be released, so that the breakage of the inner bag 28 or the outer bag 29 can be reliably recognized at an early stage.

Figure 13:
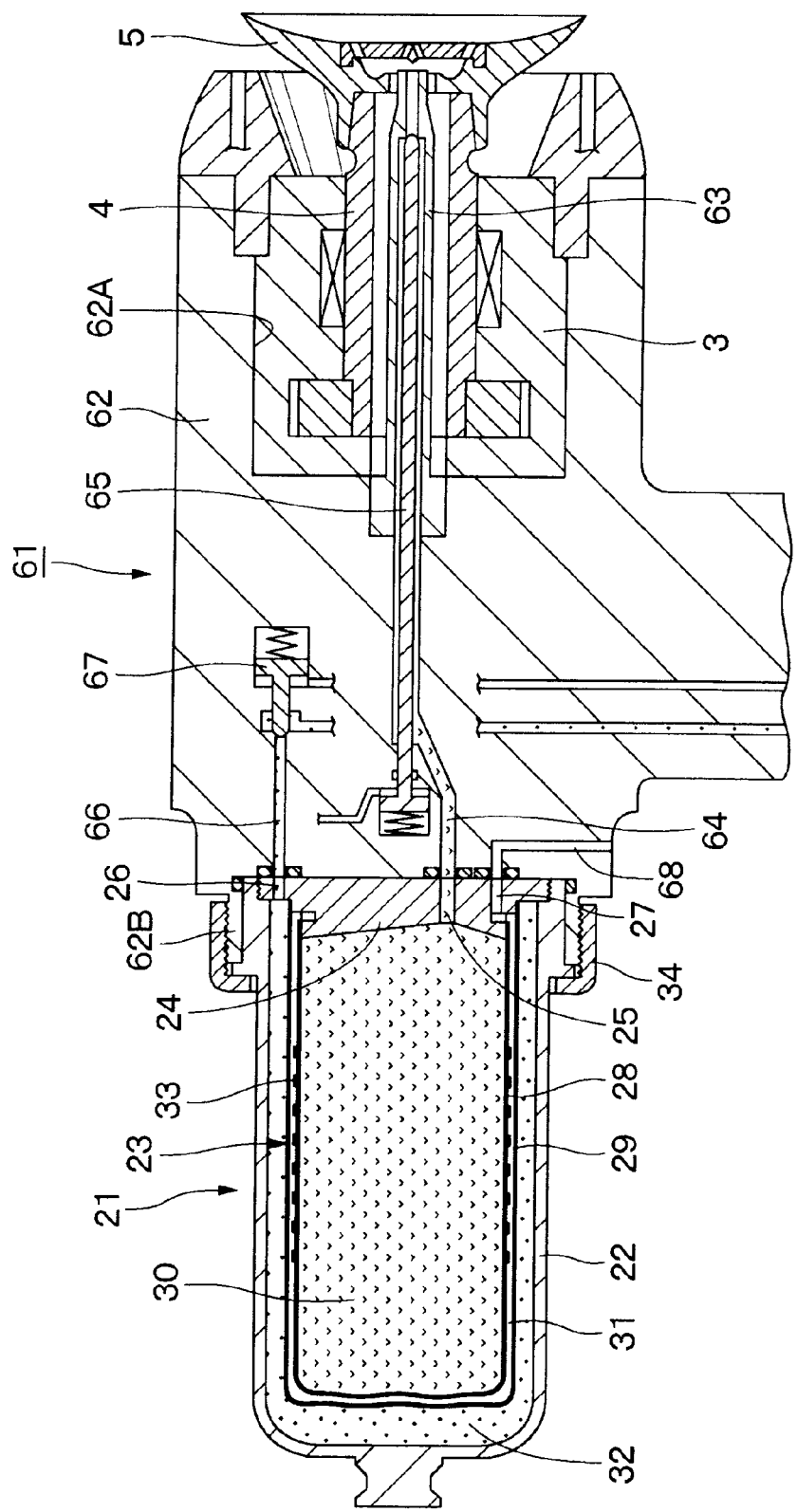
FIG. 13 is a longitudinal sectional view illustrating a state in which the paint cartridge in accordance with a fourth embodiment is mounted on the coating apparatus.

Next, FIG. 13 shows a fourth embodiment in accordance with the present invention. The present embodiment is characterized in that the paint cartridge is arranged to be directly mounted to and dismounted from the coating apparatus. It should be noted that, in the fourth embodiment, the component elements that are identical to those of the foregoing first embodiment will be simply denoted by the same reference numerals to avoid repetitions of similar explanations.

In FIG. 13, designated at 61 is a rotary atomizing head coating apparatus (hereafter referred to as the coating apparatus 61), and denoted at 62 is a housing of the coating apparatus 61. As for the housing 62 in accordance with this fourth embodiment, its front side is formed as a motor mounting recess 62A, and its rear side is formed as a support portion 62B for mounting the paint cartridge 21.

In the same way as the support portion 16 in accordance with the above-described first embodiment, this support portion 62B is formed as a short tubular body which projects toward the axial rear side and has an external thread formed on its outer peripheral side. Further, the open end portion 22A of the tank accommodating cylindrical body 22 for constituting the coating cartridge 21 is inserted and fitted to the inner side of the support portion 62B, and the retainer ring 34 is threadedly secured to its outer side. Consequently, the paint cartridge 21 can be directly mounted to the support portion 62B of the housing 62.

Indicated at 63 is a feed tube mounted in the housing 62 in such a manner as to extend through the center of the motor mounting recess 62A toward the front side, and indicated at 64 is a housing side paint passage for discharging the paint accommodated in the paint chamber 30 from the distal end of the feed tube 63. The paint passage 64 is opened and closed by a paint valve 65.

Indicated at 66 is a housing side extruding liquid passage provided in the housing 62 to allow the extruding liquid to flow out from and into the extruding liquid chamber 32, and this extruding liquid passage 66 is opened and closed by the extruding liquid valve 67. In addition, indicated at 68 is a housing side atmosphere passage provided in the housing 62 to open the annular gap space 31 to the atmosphere.

As such, the fourth embodiment can also obtain the substantially same effect as that of the first embodiment mentioned above. Particularly in the fourth embodiment, since the paint cartridge 21 can be directly mounted and dismounted to the coating apparatus 61, the structure of the paint cartridge 21 can be simplified, thereby making it possible to improve the efficiency in assembling operation and the like.

It should be noted that, in the first and second embodiments, the arrangement provided is such that the detectors 33 and 43 are respectively formed in striped patterns by the plurality of color belts 33A and 43A to 43D consisting of colored water-based inks, and as these detectors 33 and 43 are brought into contact with the paint or the extruding liquid, these color belts 33A and 43A to 43D are dissolved to change the striped patterns. Further, in the third embodiment, the arrangement provided is such that the capsular detector 53 is formed by the powder capsules 53A to 53D, and as their outer shells 53A1 to 53D1 are dissolved by the paint or the extruding liquid and the inner color powders 53A2 to 53D2 are released, to thereby allow the shape of these powder capsules 53A to 53D to change. However, the present invention is not limited to this particular example, and such a material that, apart from the pattern and the shape, the hue of the detector changes upon contact with the paint or the extruding liquid is arranged to be used, including such as a discoloring ink, a discoloring tape, a discoloring film, a discoloring power, or the like.

Namely, it is possible to adopt an arrangement in which a discoloring ink, tape, film, powder, or the like whose coloring state changes between a dry state and a liquid impregnated state is provided on the outer surface 28C of the inner bag 28 and/or the inner surface 29B of the outer bag 29 or in the annular gap space 31 so as to allow the hue to change as the material is brought into contact with the paint or the extruding liquid or impregnated therewith.

In the first embodiment, the case is illustrated in which the color belts 33A of the detector 33 are formed by printing, transferring, or applying a water-based ink onto the outer surface 28C of the inner bag 28. However, the present invention is not limited to this particular example, and it is possible to adopt an arrangement in which the color belts 33A of the detector 33 are formed by using other material such as a water-based fluorescent ink, an oil-based ink, an oil-based fluorescent ink, a coloring ink, an adhesive tape, and the like. This arrangement is similarly applicable to the second and fourth embodiments as well.

In the case where a material such as an ink, a tape, a film, a powder, or the like is provided as a detector on the outer surface 28C of the inner bag 28 or the inner surface 29B of the outer bag 29, the pattern is not limited to the striped pattern described in the first and second embodiments, and it is possible to form other patterns such as, for example, a polka dot pattern, a lattice pattern, and the like.

Meanwhile, in the first embodiment, a description has been given by citing as an example the case in which the detector 33 is provided on the outer surface 28C of the inner bag 28. However, the present invention is not limited to this particular example, and it is possible to adopt an arrangement in which the detector 33 is provided on the inner surface 29B of the outer bag 29. On the other hand, it is also possible to adopt an arrangement in which the detector 33 is provided on both the outer surface 28C of the inner bag 28 and the inner surface 29B of the outer bag 29. These arrangements are similarly applicable to the second and fourth embodiments as well.

Further, the case is illustrated in which the color belts 43A to 43D of the detector 43 in accordance with the second embodiment and the color powders 53A2 to 53D2 of the capsular detector 53 in accordance with the third embodiment are set to four colors of white, red, blue, and yellow. However, the present invention is not limited to this particular example, and the detector may be set to other hues than white, red, blue, and yellow, and the kinds of hues may be set to two, three, or more than five kinds.

Furthermore, in the respective embodiments, a description has been given by citing as an example the rotary atomizing head type coating apparatuses 1 and 61 having the rotary atomizing head 5 as the paint spraying means. However, the present invention is not limited to this particular example, and it is possible to adopt an arrangement in which a coating apparatus having, for example, an air atomizing nozzle, a hydraulic atomizing nozzle, or the like is used as the spraying means.

DESCRIPTION OF REFERENCE NUMERALS 1, 61: Rotary atomizing head type coating apparatus (Paint spraying means)
11: Cartridge assembly
12: Cartridge mounting member
13: Mounting base
14: Feed tube
15: Mounting member side paint passage
16: Support portion
18: Mounting member side extruding liquid passage
19: Mounting member side atmosphere passage
21, 41, 51: Paint cartridge
22: Tank accommodating cylindrical body
23, 42, 52: Baggy tank
24: Tank base
25: Tank side paint passage
26: Tank side extruding liquid passage
27: Tank side atmosphere passage
28: Inner bag
28A, 29A: Opening
28B, 29B: Inner surface
28C, 29C: Outer surface
29: Outer bag
30: Paint chamber
31: Annular gap space
32: Extruding liquid chamber
33, 43: Detector
33A, 43A to 43D: Color belt
53: Capsular detector
53A to 53D: Powder capsule
53A1 to 53D1: Outer shell
53A2 to 53D2: Color powder (Detecting powder)

The invention claimed is:

1. A paint cartridge including:
a tank accommodating cylindrical body formed of a transparent or translucent hollow tubular body;
a baggy tank which is provided in said tank accommodating cylindrical body as a dual structure formed by an inner bag and an outer bag, in which an interior of said inner bag serves as a paint chamber allowing efflux and influx of a paint with respect to an outside of said tank accommodating cylindrical body, and in which a space between said outer bag and said tank accommodating cylindrical body serves as an extruding liquid chamber allowing efflux and influx of an extruding liquid with respect to an outside of said tank accommodating cylindrical body; and
an atmosphere passage provided in said tank accommodating cylindrical body to open a space between said inner bag and said outer bag of said baggy tank to an atmosphere, characterized in that:
a detector which is visually recognizable from the outside through said tank accommodating cylindrical body is provided on said baggy tank,
said detector is formed by using at least one material of a hue different from a coating color of said paint, said at least one material including one or more of an ink, a tape, a film, and a powder attached to said baggy tank,
said detector is arranged so that a geometric pattern of said detector distorts in a direction toward said atmosphere passage due to contact with said paint or said extruding liquid when said inner bag or said outer bag has broken, and
said detector is provided on said baggy tank by using at least one means among application, pasting, adhesion, printing, and transfer.

2. The paint cartridge according to claim 1, wherein said detector is provided on an outer surface of said inner bag and/or an inner surface of said outer bag of said baggy tank.

3. A paint cartridge including:
a tank accommodating cylindrical body formed of a transparent or translucent hollow tubular body;
a baggy tank which is provided in said tank accommodating cylindrical body as a dual structure formed by an inner bag and an outer bag, in which an interior of said inner bag serves as a paint chamber allowing efflux and influx of a paint with respect to an outside of said tank accommodating cylindrical body, and in which a space between said outer bag and said tank accommodating cylindrical body serves as an extruding liquid chamber allowing efflux and influx of an extruding liquid with respect to an outside of said tank accommodating cylindrical body; and
an atmosphere passage provided in said tank accommodating cylindrical body to open a space between said inner bag and said outer bag of said baggy tank to an atmosphere, characterized in that:
a detector which is visually recognizable from the outside through said tank accommodating cylindrical body is provided on said baggy tank,
said detector is formed by using a first material having a first hue and including one or more of an ink, a tape, a film, and a powder attached to said baggy tank, and a second material having a second hue different from said first hue and including one or more of an ink, a tape, a film, and a powder attached to said baggy tank,
said detector is arranged so that a geometric pattern of said detector distorts in a direction toward said atmosphere passage due to contact with said paint or said extruding liquid when said inner bag or said outer bag has broken, and
said detector is provided on said baggy tank by using at least one means among application, pasting, adhesion, printing, and transfer.

4. The paint cartridge according to claim 1, wherein said geometric pattern comprises stripes arranged at intervals in a longitudinal direction of said inner bag and said outer bag of said baggy tank.

5. The paint cartridge according to claim 3, wherein said detector is provided on an outer surface of said inner bag and/or an inner surface of said outer bag of said baggy tank.

6. The paint cartridge according to claim 3, wherein said geometric pattern comprises stripes arranged at intervals in a longitudinal direction of said inner bag and said outer bag of said baggy tank.

7. The paint cartridge according to claim 3, wherein said first hue is white and said second hue is black.

8. The paint cartridge according to claim 3, wherein said first hue is white and said second hue is red, and said detector further includes a third material having a blue hue and including one or more of an ink, a tape, a film, and a powder attached to said baggy tank, and a fourth material having a yellow hue and including one or more of an ink, a tape, a film, and a powder attached to said baggy tank.

* * * * *